United States Patent [19]
Michael

[11] Patent Number: 5,322,329
[45] Date of Patent: Jun. 21, 1994

[54] COUPLING FOR A VACUUM FLUID LINE

[76] Inventor: Harald Michael, Gosslers Park 9, 2000 Hamburg 55, Fed. Rep. of Germany

[21] Appl. No.: 55,011

[22] Filed: Apr. 30, 1993

[30] Foreign Application Priority Data

May 2, 1992 [DE] Fed. Rep. of Germany ....... 4214256

[51] Int. Cl.⁵ .............................................. F16L 35/00
[52] U.S. Cl. ...................................... 285/38; 285/314; 285/331
[58] Field of Search ............... 285/315, 314, 358, 359, 285/394, 395, 396, 331, 38

[56] References Cited

U.S. PATENT DOCUMENTS

| 1,371,882 | 3/1921 | Ferguson et al. | |
| 1,966,718 | 7/1934 | Hanson | 285/314 X |
| 3,351,359 | 11/1967 | Ferraris | 285/314 X |
| 3,674,287 | 7/1972 | Selley | 285/314 X |
| 5,080,405 | 1/1992 | Sasa et al. | 285/358 X |

FOREIGN PATENT DOCUMENTS

| 0341595 | 5/1989 | European Pat. Off. |
| 0452172 | 10/1991 | European Pat. Off. |
| 2067697 | 7/1981 | United Kingdom |

*Primary Examiner*—Dave W. Arola
*Attorney, Agent, or Firm*—Larson and Taylor

[57] ABSTRACT

The coupling for a vacuum fluid line has a tubular first coupling part (10) that can be axially inserted with radial play into an annular groove (14) in the frontal face of a bushing-shaped second coupling part (12) until it reaches a tight contact position and can be locked in this position. In order to facilitate and to be able to better control the release of the coupling, it is provided that on one of the coupling parts (10,12) a separation ring (24) is positioned in an axially fixed but rotatable manner. It has a cam-shaped lateral surface (34) that supports itself on a counter-surface (36) attached to another coupling part (10) and pushes apart the two coupling parts (10,12) by wedge action when the separation ring (24) is rotated.

7 Claims, 1 Drawing Sheet

COUPLING FOR A VACUUM FLUID LINE

The invention relates to a coupling for a vacuum fluid line with a tubular first coupling part that can be axially inserted with radial play into an annular groove in the frontal face of a bushing-shaped second coupling part until it reaches a tight contact position and can be locked in this position.

Such a coupling is shown in EP 0 341 595 B1 and is illustrated there in FIG. 5. Its function is to let air penetrate through the radial gaps between the coupling parts when the latter are separated, whereby this air whisks along waste water that was possibly left behind in the coupling area and thus prevents dripping of the latter and ensures self-cleaning of the coupling. The coupling therefore is located preferably in the flow direction directly behind a valve on the side of a waste-water container that must be evacuated, and in the flow direction before another valve that closes automatically once only air is sucked through the vacuum line, causing a rise in pressure in a control device of the valve. Such valve arrangements are used e.g. to equip waste-water containers in train cars and the vacuum lines for their evacuation. Hereby the valve on the side of the train car to which the vacuum line is coupled for evacuation is automatically closed when, after evacuation of the waste water, air is sucked in and causes the pressure at the control device of the valve to rise. However, a throttle or other suitable means are used to ensure that the valve at the train car closes already before the valve at the coupled vacuum line can close, so that the latter closes only when air enters the vacuum line via the opened coupling.

It was now found that there are practical difficulties for actually opening the coupling in such a way that it functions in the intended manner. This requires a certain experience and skill that cannot always be expected to be present in the personnel used to empty the waste-water container. The difficulties can be attributed to the fact that in the tight contact position of the coupling parts, first a relatively large force must be expended in order to overcome the force generated by the vacuum present in the interior. But as soon as the tight contact position between the coupling parts is released, the resistance that must be overcome quickly decreases, and as a result the coupling parts are in most cases separated abruptly and too quickly. In the process, it may happen that waste water still drains off, either because the remaining volume could not be withdrawn during the short time of abrupt separation, or because the valve on the side of the vacuum line closed too quickly. But the application described above in the form of an example absolutely requires a drip-free coupling, since in this case fecal waste water is involved and a very large number of waste-water containers in train cars must be emptied on a daily basis in railroad maintenance yards. A single evacuation process requires approximately two to three minutes.

The invention therefore is based on the task of improving the known coupling to the extent that it can be opened more easily and the dripless opening can be better controlled.

According to the invention, this task is solved in that on one of the coupling parts an actuation element is positioned in a movable manner and said actuation element supports itself on a counter-surface attached to another coupling part and pushes apart the two coupling parts when actuated.

The proposed actuation element provides the possibility, e.g. via oblique surfaces or a lever translation, to provide a longer actuation path for the initial phase of separation of the two coupling parts, which makes it possible to achieve the desired objectives. In a preferred design, the actuation element is a separation ring that is positioned in an axially fixed but rotatable manner on one of the coupling parts and is constructed with a cam-shaped lateral surface that supports itself on a counter-surface attached to the other coupling part and pushes apart the two coupling parts by wedge action when the separation ring is rotated.

When using the separation ring of the proposed coupling, the latter's parts no longer need to be pulled apart with a relatively large force, since the wedge action of the cam-shaped lateral surface of the separation ring supports the manual force. It is also ensured that the coupling parts can be moved apart slowly enough so that the air taken in through the radial gaps between them is able to whisk along and transport off wastewater residues that after the closing of the valve on the container side were left standing behind it, before the valve on the suction side closes automatically.

In a preferred design of the invention, the separation ring is used simultaneously to unlock the coupling parts. For this purpose, it is suggested that it be positioned on the bushing-shaped second coupling part and that it hold, when coupled with part of its circumference at least one locking element that is guided in a movable manner in the radially exterior area of this coupling part engaged with a recess in the first coupling part, but that be equipped on another part of its circumference with a recess which, during rotation of the separation ring for the purpose of uncoupling, permits the locking element to protrude from the recess in the first coupling part. Possible locking elements may consist e.g. of several spheres distributed over the circumference.

According to another preferred design of the invention, a radially projecting handle that further facilitates handling is attached to the separation ring.

An embodiment of the invention is described in more detail below using the drawing.

Figure 2:
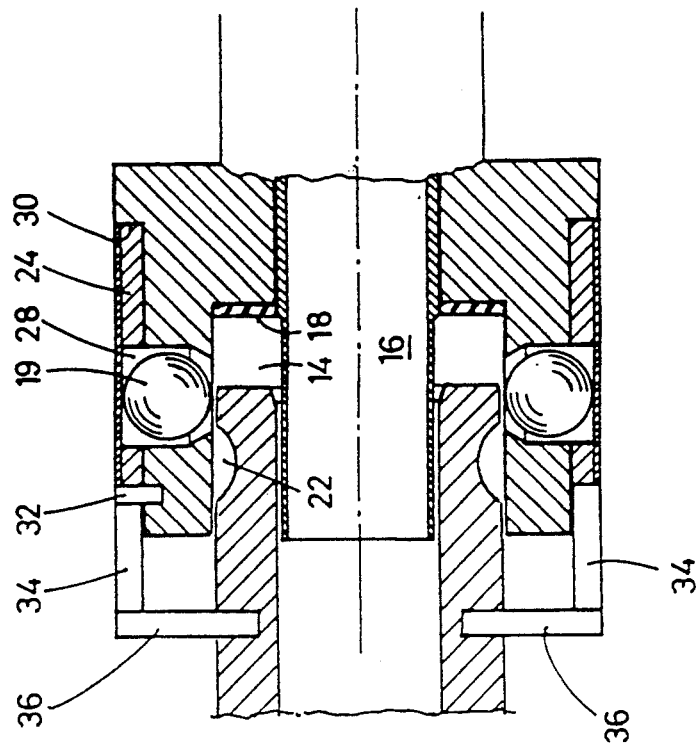
FIG. 2 shows a longitudinal section of the coupling according to FIG. 1 in an intermediate position during the release.

The illustrated coupling consists of a tubular first coupling part 10 and a bushing-shaped second coupling part 12. The coupling part 10 is connected to a line leading to a waste-water container, while coupling part 12 is connected to a low pressure or vacuum line. It is preferred that hereby a valve of the type described in EP 0 341 595 B1 is located on both sides of the coupling.

The coupling part 12 is constructed on the side that in the drawing is to the left with an annular groove 14 that extends from the frontal face axially into the body of the coupling part and has such a position and radial width that the tubular coupling part 10 can be axially inserted into it with internal and external play. It is irrelevant for the function and thus for the invention also whether coupling part 12 is made of one part or is composed of two tightly connected parts, of which the radially interior one delimits the flow-through channel 16 and forms the radially interior wall of the annular groove 14. The preferred material for coupling parts 10 and 12 is metal or plastic.

Figure 1:
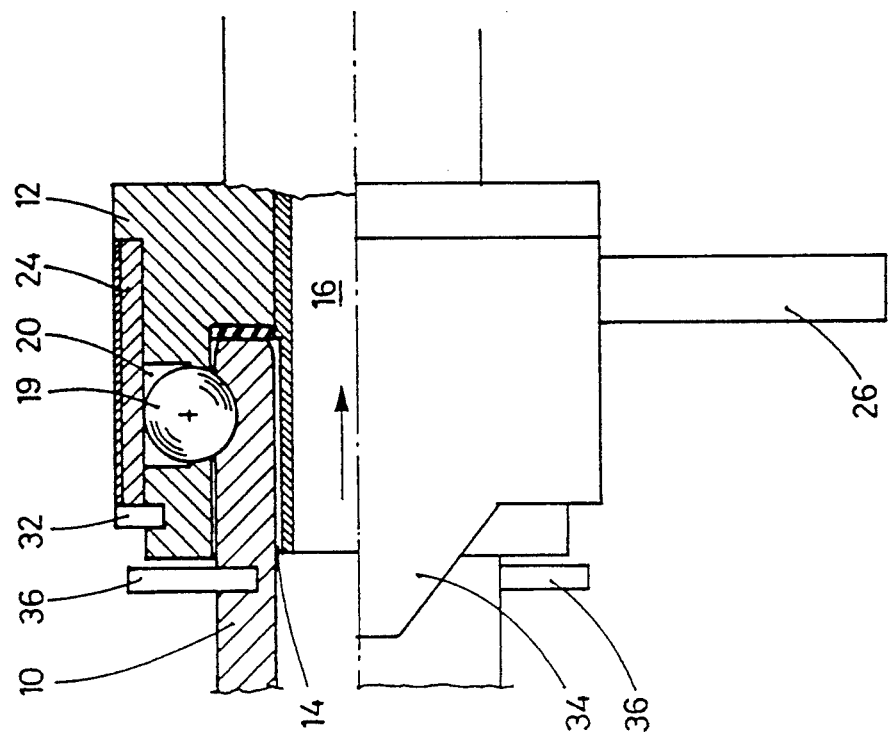
FIG. 1 shows a longitudinal section through the coupling of a low pressure waste-water line and a lateral view of the coupled state.

On the bottom of the annular groove 14 an elastic seal 18 is attached that in the coupled state according to FIG. 1 is in tight contact with the frontal end of the tubular coupling part 10. The two coupling parts 10, 12 in this state are locked by several spheres 19 distributed over the circumference that are guided in a radially movable but captive manner in radial bores in coupling part 12 and are able to engage with fitting concave recesses 22 in coupling part 10. In the coupled and locked state shown in FIG. 1, the spheres 19 are held engaged with recesses 22 by a ring 24 that is positioned rotatably on coupling part 12 and are prevented from radial shifting towards the outside. By rotating the ring 24 with a handle 26 that is molded to it or attached to it, interior recesses 28 in the ring can be guided towards the spheres 19. Then the latter are able to shift radially towards the outside and release coupling part 10 when the latter is whisked away axially from coupling part 12.

The ring 24 that is fixed axially, e.g. between a shoulder surface 30 and a pin 32 on coupling part 12 is however not only used to secure or release the lock of the coupling parts by way of spheres 19 or other shaped locking elements that are radially guided in a movable manner, but also functions as separation ring of the coupling. For this purpose, the lateral surface of the ring 24 that is left in the drawing is constructed so as to be diametrically opposed with cam-shaped axial projections 34. These cams each work together with one counter-surface, e.g. in the form of a pin 36 located on the first coupling part 10, in such a manner that the oblique surfaces of the cams 34 slide along pin 36 when the ring 24 is rotated, whereby the ring 24 together with coupling part 12, in reference to the drawing, is pushed increasingly further to the right relative to the pins 36 and the first coupling part 10. Based on the coupled and locked status according to FIG. 1, the tight contact of coupling part 10 with seal 18 can be released with little force, solely by rotating ring 24 by way of handle 26, without risking that both coupling parts are completely separated from each other immediately in an abrupt manner. After releasing the tight contact with a relatively short axial relative movement of the two coupling parts 10, 12, air is drawn from the outside through the radial gaps between the coupling parts and whisks along the waste water left behind in the area of the coupling. After this, the air that has entered between the coupling parts causes the valve located on the suction side of the coupling to close.

It is understood that the cams 34 on ring 24 are not permitted to push apart coupling parts 10, 12 axially before the spheres 19 are able to leave recesses 22 and are able to shift radially towards the outside into recesses 28. But it is not difficult to locate oblique surfaces as transitions at recesses 22, recesses 28, or bores 20 in such a manner that the beginning of the backward movement of the spheres 19 during the rotation of ring 24 coincides with the beginning of the pushing apart of the two coupling parts 10, 12 by the cams 34 that press against pins 36.

The illustrated coupling has been described above for an application in a vacuum wasterwater line. But it naturally may also be used for other purposes where fluids are transported by a vacuum and where both easy operation and drip-less operation during the opening of the coupling are desired.

I claim:

1. A coupling for a vacuum fluid line comprising:
   a tubular first coupling part;
   a bushing-shaped second coupling part having a frontal face and an annular groove in said frontal face thereof, said annular groove being sized to axially receive said tubular first coupling part therein with radial play provided therebetween; and sealing means therebetween for sealing contact with said first and second coupling parts;
   a locking means for releasably holding said first coupling part in axial sealing contact with said second coupling part;
   an actuation element;
   a mounting means for mounting said actuation element movably to one of said first and second coupling parts; and
   a counter surface attached to the other of said first and second coupling parts which engages said actuation element during movement thereof such that when said first and second parts are no longer held by said locking means in sealing contact a relative movement of said actuation element and said counter surface causes said first and second coupling parts to move axially away from one another.

2. A coupling as claimed in claim 1
   wherein said actuation element is a separation ring having a cam-shaped lateral surface;
   wherein said mounting means mounts said separation ring axially in position but rotatably with respect to said one of said first and second coupling parts; and
   wherein said counter surface on said other of said first and second coupling parts engages said cam-shaped surface of said separation ring so that rotation of said separation ring causes said first and second parts to be axially pushed away from one another by a wedge action.

3. A coupling as claimed in claim 2 wherein said separation ring includes a radially projecting handle with which said separation ring is easily turned.

4. A coupling as claimed in claim 2
   wherein said one of said first and second coupling parts to which said separation ring is rotatably mounted is said bushing-shaped second coupling part;
   wherein said locking means includes at least one locking element which is radially movable in said bushing-shaped second coupling part;
   wherein said tubular first coupling part includes an exterior surface and at least one first recess in said exterior surface which is radially aligned and axially engaged with said at least one locking element when said first and second coupling parts are in sealing contact;
   wherein said separation ring includes an interior circumferential surface and at least one second recess in said interior surface which is axially positioned in radial alignment with said at least one locking element when said first and second coupling parts are released from sealing contact;
   such that when said tubular first coupling part is moved into sealing contact with said bushing-shaped second coupling part, said separation ring is rotatable to drive said locking element from said second recess of said separation ring and into said first recess of said tubular first coupling part and to thereby hold said first coupling part and second coupling part in axial sealing contact; and such that when said first and second coupling parts are locked in axial sealing contact, said separation ring is rotatable to allow said locking element to move from said first recess of said tubular first coupling part into said second recess of said separation ring as said first and second coupling parts are separated.

5. A coupling as claimed in claim 4 wherein there are a plurality of said first recesses distributed circumferentially over said exterior surface of said tubular first coupling part, a corresponding plurality of said second recesses distributed circumferentially over said interior surface of said separation ring, and a corresponding plurality of said locking elements.

6. A coupling as claimed in claim 5 wherein said locking elements are spheres, and wherein said bushing-shaped second coupling part includes a corresponding plurality of radial bores in which respective said spheres are movably guided.

7. A coupling as claimed in claim 6 wherein said separation ring includes a radially projecting handle with which said separation ring is easily turned.

* * * * *